UNITED STATES PATENT OFFICE.

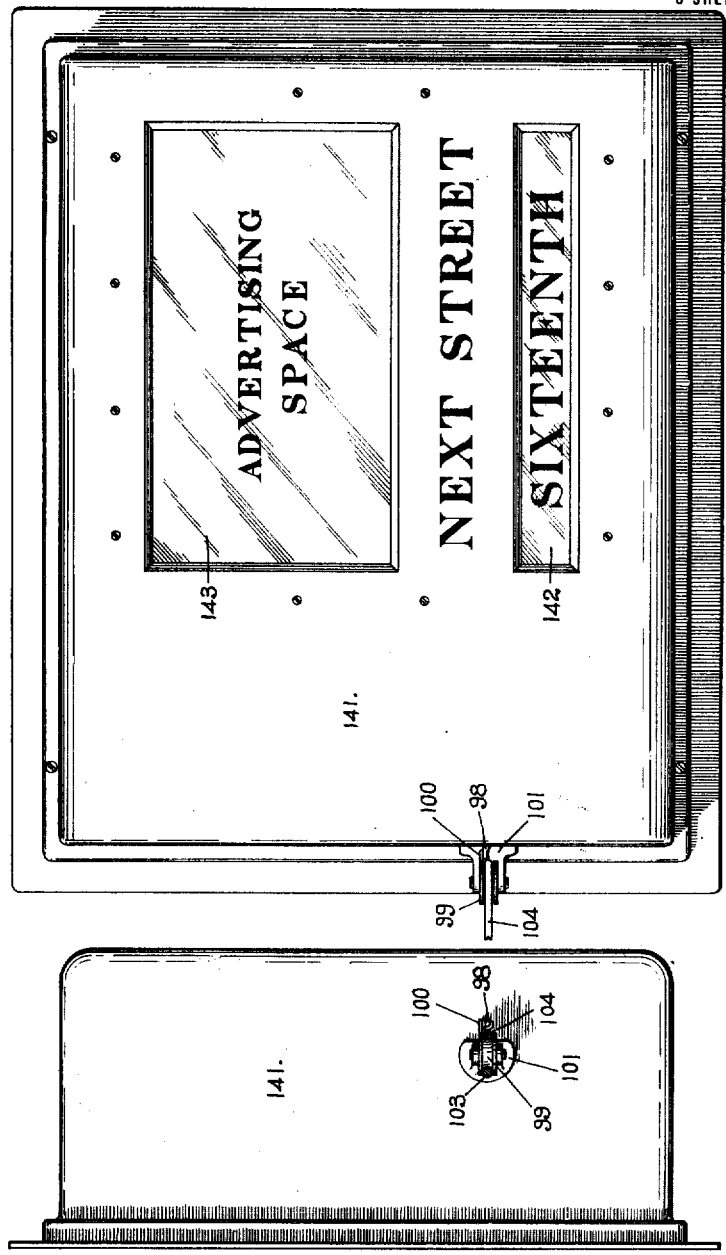

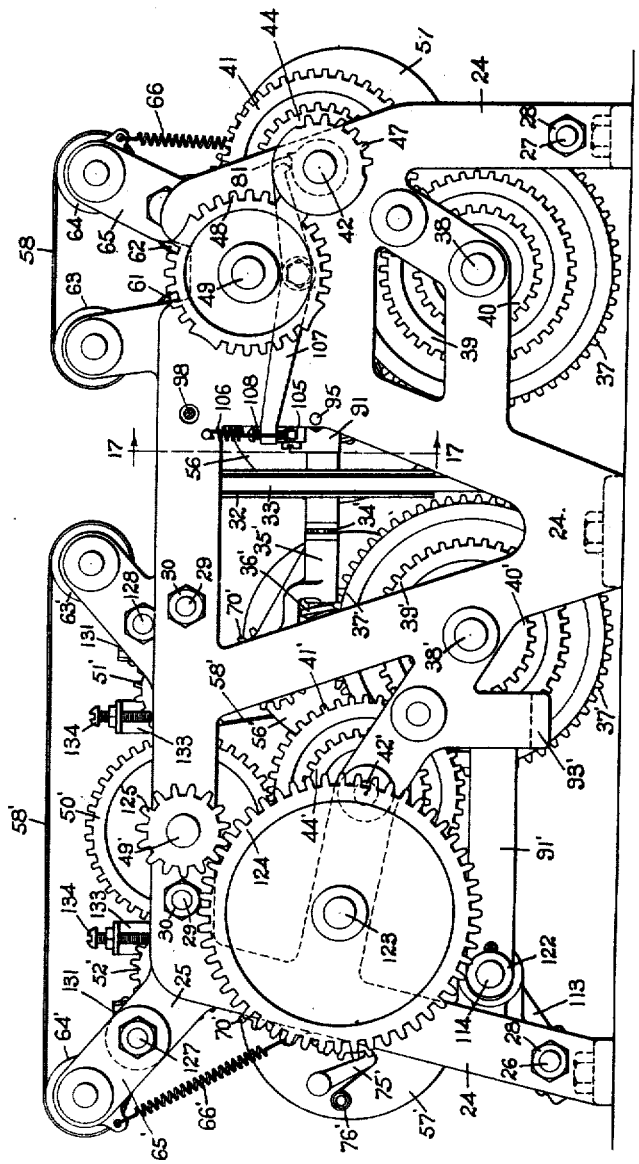

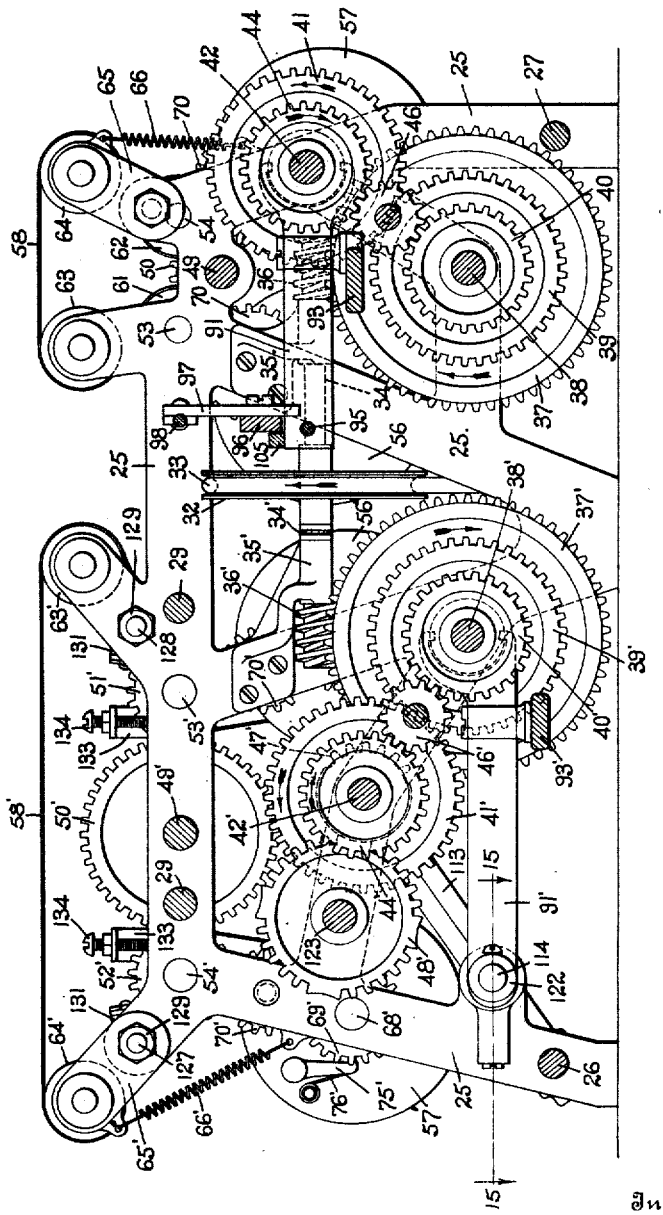

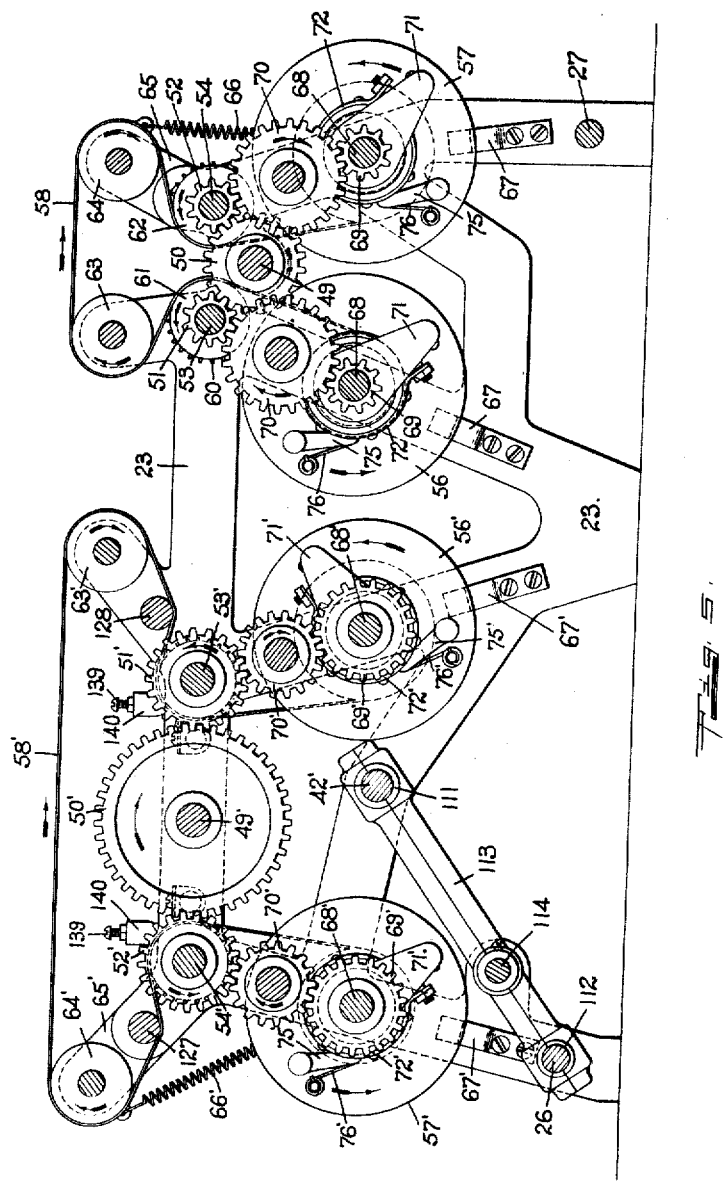

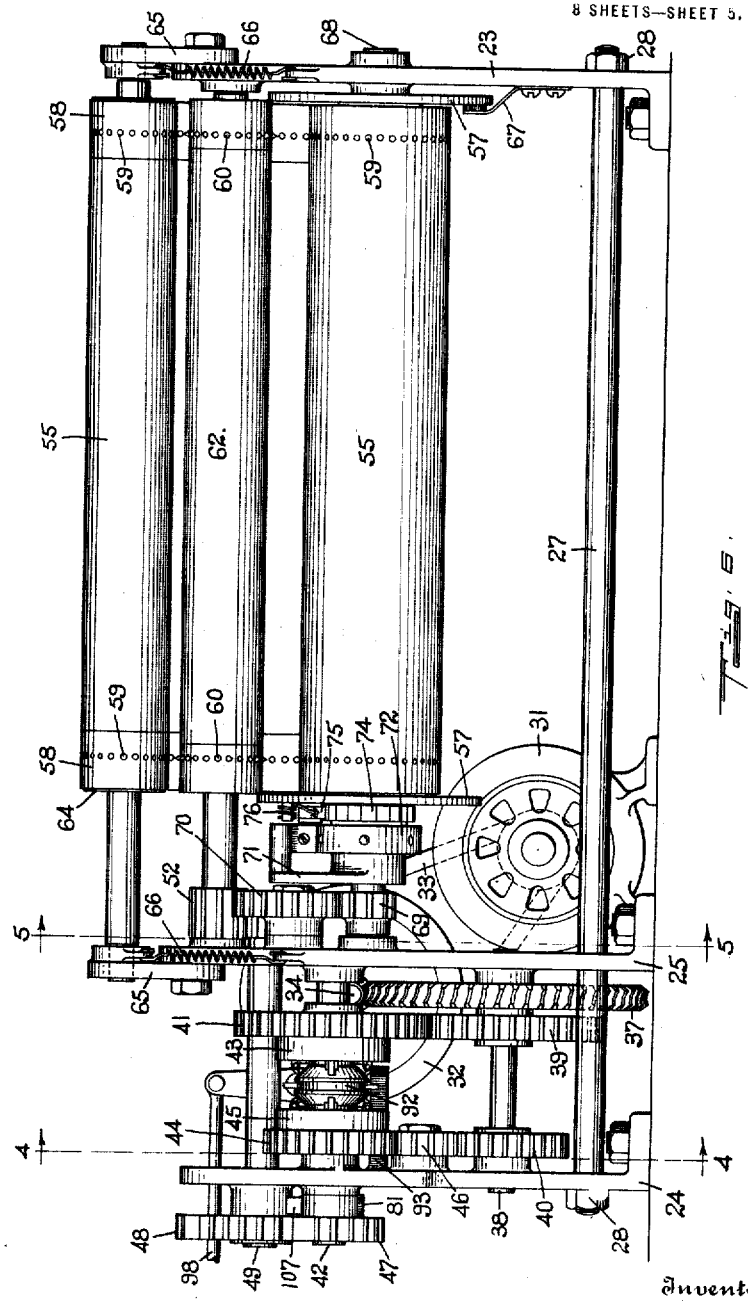

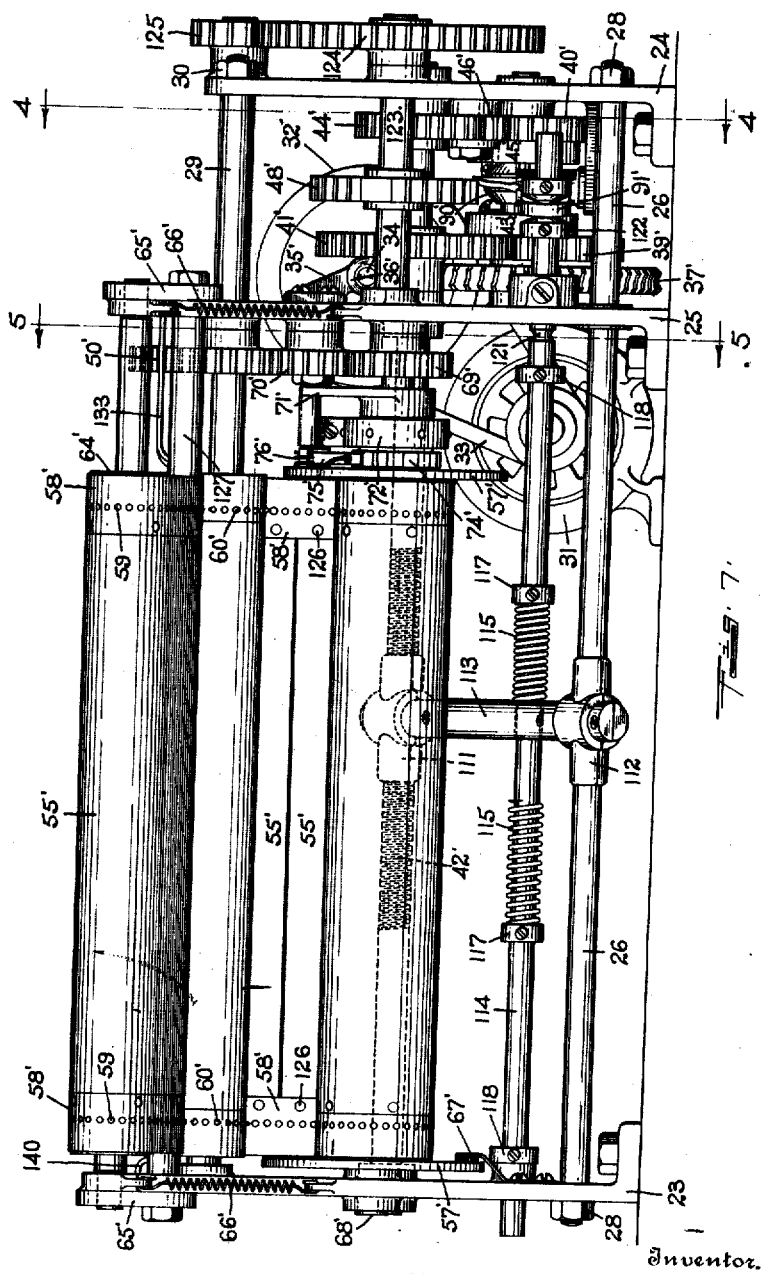

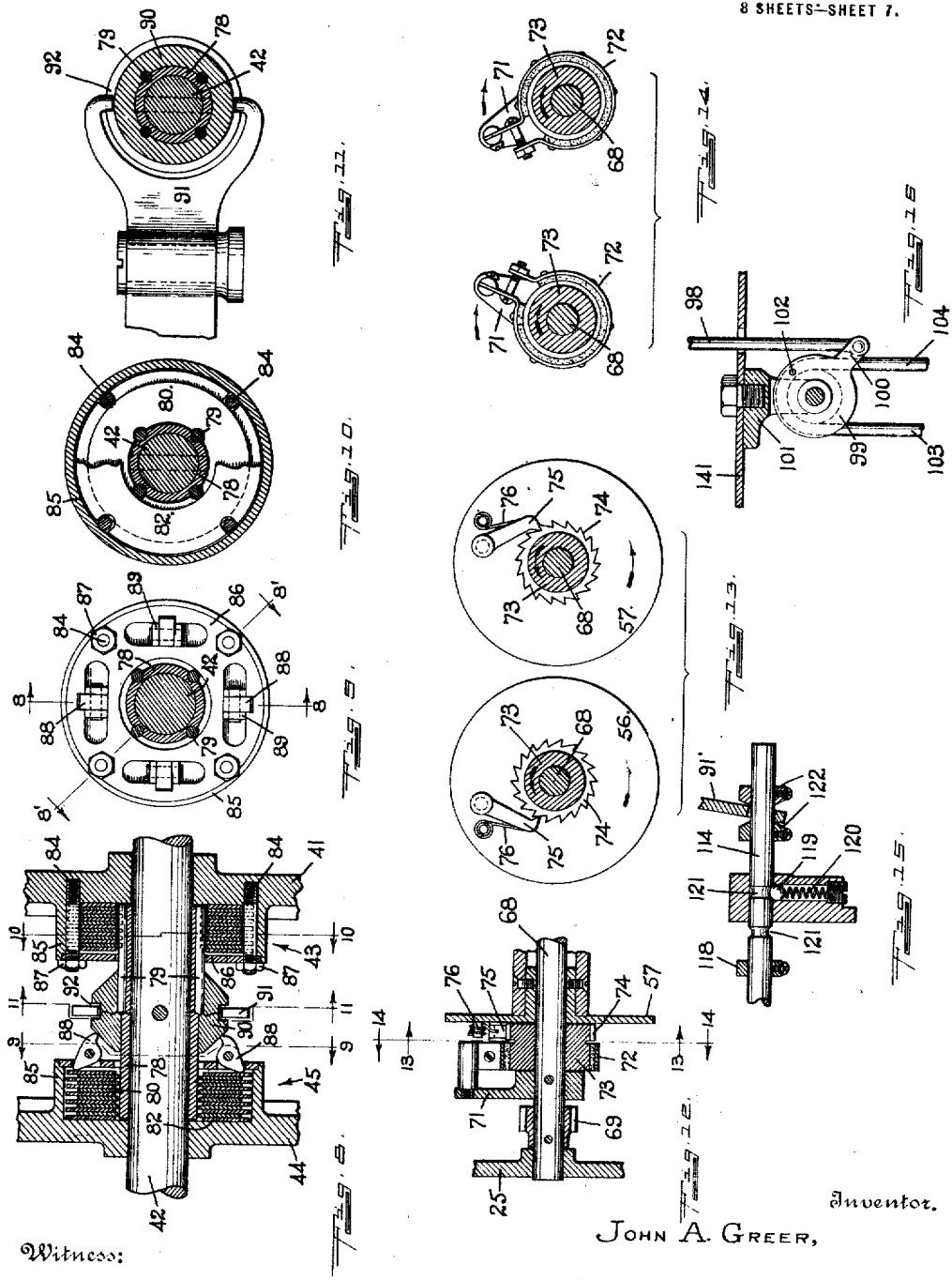

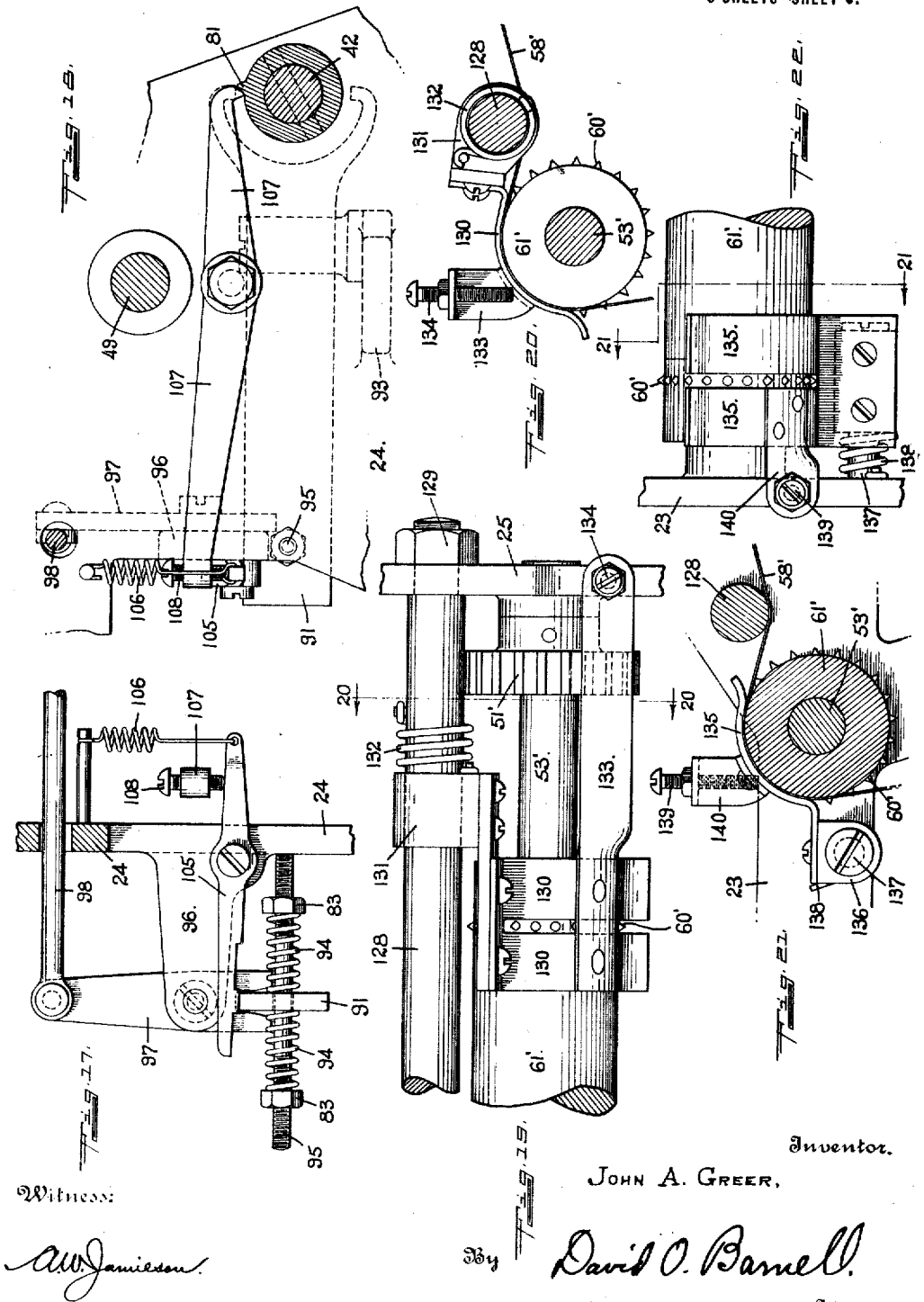

JOHN A. GREER, OF OMAHA, NEBRASKA.

STATION-INDICATOR AND ADVERTISING DEVICE.

1,336,032.   Specification of Letters Patent.   Patented Apr. 6, 1920.

Application filed September 20, 1918. Serial No. 255,210.

*To all whom it may concern:*

Be it known that I, JOHN A. GREER, a citizen of the United States, residing at Omaha, in the county of Douglas and State of Nebraska, have invented certain new and useful Improvements in Station-Indicator and Advertising Devices, of which the following is a specification.

My invention relates to the general class of changeable exhibitors, particularly to such exhibitors of the motor-operated type, and characterized by the use of multiple reels and webs. It is the object of my invention to provide a mechanism of this class for use in railway and street cars and the like, to indicate successively the names or designations of streets or stations as the same are approached, the indicating mechanism being driven by a motor but manually controlled, and being reversible at any time, so that, when the mechanism is used on a car having a certain normal route for which the web is prepared, the action of the exhibitor may be made to conform with the travel of the car when the latter is turned before reaching the end of its normal route. A further object of my invention is to provide, in combination with the station indicating mechanism, an advertising display mechanism of similar character, except that the same is operated continually by the motor and is automatically reversed at each end of a predetermined travel of the web, instead of being controlled and reversed manually. Further objects of my invention are the provision of suitable mechanism for actuating the reels, reversing the movement thereof, controlling the reversing, proportioning the periods of movement and quiescence, controlling the re-winding of the charactered web and the unwinding thereof from the supply reel, and performing other sub-functions of the mechanism as a whole, all of which will be hereinafter fully set forth.

In the accompanying drawings Figure 1 is a front view and Fig. 2 is a side view, showing the external appearance of a machine embodying my invention, as the same would appear in actual use. Fig. 3 is a side view of the operating mechanism as removed from the casing or inclosure and disposed in a horizontal position, instead of the vertical position which it occupies in the casing. Fig. 4 is a vertical section on the plane of the line 4—4 of Figs. 6 and 7. Fig. 5 is a vertical section on the plane of the line 5—5 of Figs. 6 and 7. Fig. 6 is an end view of the operating mechanism, showing particularly the station-indicating part or group thereof. Fig. 7 is an end view of the mechanism viewed oppositely from Fig. 6, and showing particularly the part or group of elements involved in the advertising display. Fig. 8 is a detail longitudinal section through a pair of the disk clutches, the left-hand portion of the figure being taken on a plane such as of the line 8—8 in Fig. 9, and the right-hand portion being taken on a plane such as of the line 8'—8' in Fig. 9. Fig. 9 is a detail transverse section on the line 9—9 of Fig. 8. Fig. 10 is a section on the line 10—10 of Fig. 8. Fig. 11 is a section on the line 11—11 of Fig. 8. Fig. 12 is a detail longitudinal section of the frictional driving mechanism for one of the reels. Fig. 13 is a detail transverse section on the plane and looking in the direction indicated by the arrows 13—13 of Fig. 12. Fig. 14 is a section on the same plane as Fig. 13 but viewed oppositely thereto, as indicated by the arrows 14—14 in Fig. 12. Fig. 15 is a detail section through a portion of the automatic clutch-reversing device, the section being on the plane of the line 15—15 of Fig. 4. Fig. 16 is a detail horizontal section through a portion of the manually controlled clutch-operating mechanism. Fig. 17 is a detail vertical section on the line 17—17 of Fig. 3, showing a further portion of the manually controlled clutch-operating mechanism. Fig. 18 is a detail side view of portions of said clutch-controlling and operating mechanism. Fig. 19 is a detail plan view of certain guiding devices for the perforated web. Fig. 20 is a vertical section on the line 20—20 of Fig. 19. Fig. 21 is a detail vertical section on the line 21—21 of Fig. 22, and Fig. 22 is a detail plan view of guiding devices similar to and performing the same functions as the guiding devices shown in Figs. 19 and 20, but modified to apply to the opposite side of the machine.

In the illustrated embodiment of my invention the operating mechanism is carried upon a frame comprising side members 23 and 24, and an intermediate member 25, the latter being of a form similar to the side-member 23. Said three frame members each have foot-portions adapted for connection with a suitable base, and are held in spaced parallel and vertical relation by means of rods 26 and 27 which pass through the same as shown, the end-portions of said rods being shouldered, threaded, and provided with nuts 28 which engage the outer sides of the frame members 23 and 24. The frame members 24 and 25 are further connected by rods 29 of which the end-portions are also shouldered, threaded, and provided with nuts 30.

Power for operating the mechanism is preferably furnished by a small electric motor 31, from which a belt 33 extends to a pulley 32, said pulley being secured on a shaft 34 which is journaled in bearings 35 and 35' mounted on the intermediate frame member 25. The shaft 34 is provided terminally with worms 36 and 36' which mesh with worm-wheels 37 and 37', respectively, and drive the same in like directions. A ball thrust-bearing 34' is disposed around the shaft 34 between the hub of the pulley 32 and the bearing 35', to receive the end-thrust caused by the reaction of the worm-wheels against the worms. The station-indicating mechanism and the advertising display mechanism are driven respectively by the worm-wheels 37 and 37', the two groups of mechanism being located at the right and left, respectively, of the pulley 32 as viewed in Figs. 3 and 4. With certain exceptions, to be hereinafter noted, said two groups of mechanism are alike, and the similar or corresponding parts thereof are designated by like reference numerals, the numbers referring to the advertising mechanism being distinguished, however, by the addition of prime indices (') thereto.

Referring first to the station indicating mechanism, the worm-wheel 37 is secured on a shaft 38 which is journaled in bearings formed in the frame members 24 and 25. On said shaft 38 there is fixedly mounted a gear 39 through which the mechanism is driven in one direction, and a gear 40 through which the mechanism is driven in the opposite or reverse direction. The gear 39 meshes directly with a gear 41 which is mounted revolubly on a shaft 42, and the gear 40 meshes with an intermediate gear or pinion 46 which drives a gear 44, the latter also being mounted revolubly on the shaft 42. Said gears 41 and 44 are thus driven continuously in opposite directions, and the hub-portions of said gears are provided respectively with clutches 43 and 45, hereinafter described in detail, by means of which the gears may be connected alternatively with the shaft 42 to drive the same in either direction, or, with the clutch-controlling mechanism at neutral or intermediate position, to leave the gears free upon the shaft so as not to actuate the same.

The shaft 42 projects through the frame member 24, and at the outer side thereof carries an interrupted pinion 47 adapted to intermesh operatively with a quadruply interrupted gear 48 carried on the end of a shaft 49. Said shaft is journaled in bearings in the frame members 24 and 25, and at the inner side of the latter carries a gear 50 which meshes with pinions 51 and 52 on the drive-roller shafts 53 and 54. Said shafts carry drive-rollers 61 and 62 which are provided near their ends with circumferential series of pointed teeth or pins 60, said teeth being adapted to engage and positively actuate the engaged portions of the web or station-indicating strip 55. Said strip or web is formed of flexible material such as cloth or tough paper, and is provided along its edges with reinforcing strips 58 having therein longitudinal series of equally-spaced perforations or openings 59 for receiving the pins or teeth 60. One end of the strip or web 55 is secured to a spool or reel 56, and the other end is similarly secured to a second reel 57, said reels being mounted revolubly on shafts 68 of which the end-portions are journaled in the frame members 23 and 25. The characters or indicia for designating stations are printed or otherwise marked on the web 55 in transversely extending lines uniformly spaced longitudinally of the web. From the reel 56 the web passes first around the feed-roller 61, thence over guide-rollers 63 and 64, thence around the feed-roller 62, and finally to the second reel 57. The guide-roller 63 is carried on a shaft of which the end-portions are journaled in the frame members 23 and 25, and the roller 64 is similarly mounted on a shaft which is journaled in a pair of arms 65 connected pivotally with said frame members. Springs 66 are connected with the frame members and said arms 65, as shown, and serve to hold under tension the portion of the web extending over the guide-rollers from one feed-roller to the other. For retarding rotation of the reels 56 and 57, the end-flanges thereof are frictionally engaged by brake-shoes which are held yieldingly in contact with the flanges by means of springs 67 carried on the frame member 23 as shown in Figs. 5 and 6. The reels are driven, to wind the web thereon, by means of the frictional and differential driving devices shown in detail in Figs. 12, 13 and 14, and constructed as follows: Each of the shafts 68 has a pinion 69 secured thereon adjoining the frame member 25, said pinions meshing with intermediate gears 70 mounted revolubly on stub-shafts carried by said frame member 25, and said gears 70 meshing with and being driven by the pinions 51 and 52. Adjoining each of the pinions 69 a crank 71 is secured to the shaft, said crank carrying a friction-band 72 which engages the periphery of a drum 73, said drum being mounted revolubly on the shaft 68 between the crank and the adjacent end of the respective reel. A portion of the drum, adjoining the reel, is provided with ratchet-teeth 74, and a pawl 75 pivoted on the end-flange of the reel is held yieldingly in engagement with said ratchet-teeth by means of a spring 76. The pinions 69 are so proportioned to the pinions 51 and 52 that the reels may be driven at a rate such as to wind the web on the bare core of the receiving reel at a rate equal to that at which the web is delivered by the drive-rollers. Then, as the effective diameter of the receiving reel is increased by the successive layers of the web wound thereon, the tendency to wind the web more rapidly is compensated by slippage at the frictional driving connection between the band 72 and drum 73. Referring to Figs. 5 and 13, and assuming that the parts are driven in the direction of the arrows in said figures, so that the web is being wound onto the reel 57 and unwound from the reel 56, it will be seen that the ratchet connection to the receiving reel 57 from the frictionally driven drum 73 is such that said reel is driven at the same rate as the drum, whereas the ratchet connection to the supplying reel 56 is such that the drum may rotate at a greater speed than the reel, or so that said reel will not be actuated except as it is rotated by the drawing of the web therefrom. Obviously, when the direction of movement of the driving connections is reversed, the pawl and ratchet will form a positive connection between the reel 56 and the respective drum 73, while the reel 57 may rotate at a lower speed than its drum 73.

Referring now to the means for reversing and controlling the driving connections between the motor and the feed-rollers and reels, the clutches 43 and 45 hereinbefore mentioned may be of the multiple-disk type shown in detail in Figs. 8 to 11, inclusive. In the illustrative structure, a sleeve 78 is secured on the shaft 42 between the gears 41 and 44, said sleeve being longitudinally grooved to receive a plurality of spline-rods 79. Near each end of the sleeve 78 a plurality of annular clutch-disks 80 are mounted slidably thereon, the inner edges of said disks being notched to pass over the spline-rods, which prevent relative rotation of said disks and the sleeve. The adjacent sides of the gears 41 and 44 have annular hubs 85 which form casings for the clutches, and the ends of said casings have cover-plates 86 secured thereon by nuts 87 screwed on the ends of rods 84 which extend through the casings outside the peripheries of the disks 80. A second set of annular clutch-disks, 82, are arranged in alternating relation with the disks 80, the inner diameter of said disks 82 being such that the sleeve-splines 79 may rotate therein, and the outer edges of said disks 82 being notched to fit slidably on the rods 84, which prevent relative rotation of said disks and the casings 85. The cover-plates 86 each have pairs of lugs 89 turned outwardly therefrom, and between each pair of said lugs a lever 88 is mounted pivotally, one end of said lever being adapted to engage the clutch-disks to press the same together axially, and the other or outer end of the lever being adapted for engagement with the end-portion of a double clutch-cone 90. Said cone-member 90 fits slidably on the intermediate portion of the sleeve 78, being grooved internally to pass over the spline-rods 79, and being provided intermediate its ends with an external annular groove 92 for receiving the terminal portions of a forked lever 91. Said lever is fulcrumed on a bracket 93 which extends inwardly from the frame member 24. At a normal or intermediate position of the lever 91 the cone-member 90 is so positioned that both of the clutches 43 and 45 are in release position, while movement of the cone-member from the intermediate position thereof toward either of the clutches causes the disks 80 and 82 of the respective clutch to be pressed together, to thereby operatively connect the sleeve 78 with the gear 41 or gear 44, as the case may be. The end of the clutch-lever 91 opposite the cone-member 90 has an opening therein through which is extended a rod 95, said rod being carried by the frame member 24 and extending inwardly therefrom as shown in Fig. 17. Nuts 83 are screwed on the threaded portions of said rod and springs 94 are disposed around the rod between said nuts and the lever, said springs being arranged to hold the lever normally in its intermediate or neutral position. A lug 96 extends in from the frame member 24 above the rod 95, and a lever 97 is pivoted on said lug, said lever having a forked lower end-portion which straddles the lever 91, so that the latter may be actuated thereby. A notched-latch lever 105 is pivoted on the side of the lug 96, and the outer end of said lever is connected with a tension spring 106 which tends to hold the inner end of the latch-lever in engagement with the clutch-lever 91. By pushing or pulling upon a rod 98 connected with the upper end of the lever 97, the clutch-lever 91 may be moved from its neutral or intermediate position to a position for operating the clutch 43 or the clutch 45. At either of said clutch-engaging positions of the lever 91 the latch-lever drops into position for preventing return of the clutch-lever to release or neutral position. For automatically actuating the latch-lever to release the clutch-lever after a predetermined movement of the shaft 42, a lever 107 is pivoted on the side of the frame member 24, as shown in Fig. 18, said lever 107 having at one end an adjusting-screw 108 engaging the latch-lever, and at the other end having a portion adapted for engagement with a cam-lug 81 formed on the hub of the interrupted pinion 47 on the shaft 42. The control-rod 98 is extended through an opening in the casing 141 and is connected pivotally with a crank-arm 100 carried by a small pulley 99, said pulley being mounted pivotally on a bracket 101 on the side of the casing, as shown in Figs. 1, 2 and 16. A flexible cord or cable has a portion thereof fixedly connected with the pulley 99 by means of a pin 102, and portions 103 and 104 of the cable are extended to any desired position. By momentary tension upon the cable-portion 103 the rod 98 is pushed inwardly and the clutch-lever actuated to engage the clutch 43, and by similar tension upon the cable-portion 104 the rod 98 is pulled outwardly and the clutch-lever actuated to engage the clutch 45, the clutch-lever being retained in either position by the latch-lever 105, until said latch-lever is released by the lever 107 to enable the springs 94 to return the clutch-lever to neutral position. Upon operation of either of the clutches 43 and 45 to connect the gears 41 and 44 with the shaft 42, said shaft is driven and actuates the described web-feeding mechanism through the medium of the interrupted pinion 47 and gear 48. During that portion of the revolution of the pinion 47 in which the blank or untoothed portion thereof is passing the gear 48, the cam-lug 81 engages and lifts the release-lever 107, thereby moving the latch-lever 105 so as to free the clutch-lever. The structure of the clutches 43 and 45 is such, however, that after the cone-member 90 is disengaged from the levers 88 there is a continued frictional engagement between the clutch-plates sufficient to cause rotation of the shaft 42 until the teeth of the interrupted pinion 47 engage the gear 48, the pinion "floating" or moving with slight force until said position is reached, when the resistance to further rotation is enough to stop the motion and complete the releasing of the clutch. If the same clutch is again operated, the movement of the web-feeding mechanism will be started instantly, since the toothed portion of the pinion 47 is already in engagement with the gear 48, but if the other clutch be operated, as when the direction of feed of the web is to be reversed, it is necessary to pull the control-cable twice, or to maintain a tension thereon more than momentarily. If the reversing cable is pulled only momentarily, the operated clutch will be released as the cam-lug 81 passes the end of the release-lever 107, thus stopping the motion before the toothed portion of the pinion 47 has actuated the gear 48, so that a second pull of the control-cable is necessary to cause the first reverse movement of the web. If the tension of the control cable is maintained until the cam-lug has passed the release-lever, a second pull of the cable is, of course, unnecessary.

Referring now to the advertising display mechanism, the movable web thereof is preferably formed in separable sections 55' of which the length corresponds with the length displayed at each of the intermittent movements of the feed mechanism. The edges of the sections 55' are secured by means of rivets 126, or the like, to the adjacent edges of strips or bands 58' of strong flexible material such as fabric or thin steel. Said bands 58' are perforated similarly to the strips 58, adapting the same to receive the teeth or pins 60' of the drive-rollers 61' and 62', by which the web is driven. The movable web as a whole has the ends thereof attached to a pair of reels 56' and 57', the web-portions intermediate said reels passing around the drive-rollers 61'—62' and the guide-rollers 63'—64', of which the latter is mounted on pivoted arms 65' having springs 66' for holding the web under tension. Pinions 51' and 52' on the drive-roller shafts 53' and 54' are driven by a gear 50' carried on the shaft 49' which is journaled in the frame-members 24 and 25. The reels 56' and 57' are driven frictionally and differentially by means of pinions 70' and 69', cranks 71', friction-bands 72', drums 73', ratchets 74' and pawls 75', all of said parts being constructed and operating similarly to the corresponding parts of the station-indicating mechanism. The shaft 49' carries at its outer end, adjoining the frame member 24, a pinion 125 which is driven by a gear 124 carried on a shaft 123. On said shaft 123, between the frame members 24 and 25, there is secured a quadruply interrupted gear 48' which is adapted to mesh with and be driven by an interrupted pinion 47', shown by dotted lines only in Fig. 4, said pinion being carried on a shaft 42'. On said shaft 42', gears 41' and 44' are fixedly secured, the gear 41' meshing directly with a gear 39' on the worm-wheel shaft 38', and the gear 44' meshing with an intermediate pinion 46', which, in turn, meshes with a gear 40' on the shaft 38'. The gears 39' and 40' are mounted revolubly on said shaft 38' and are adapted to be operatively connected with said shaft by means of clutches 43' and 45' corresponding in structure and function with the clutches 43 and 45 hereinbefore described. It will be noted that while said clutches 43' and 45' are differently located from the clutches 43 and 45, the former being located on the worm-wheel shaft, or at the beginning of the reversing gear train instead of the end thereof, the general operation of the two groups of mechanism is substantially the same. The extra gear 124 and pinion 125, in the driving train of the advertising display mechanism, are introduced merely for the purpose of obtaining a higher speed ratio, corresponding to the greater length of the movable web 55' which it is desirable to feed during each period of movement of the driving mechanism.

The clutches 43' and 45' are controlled by a clutch-lever 91' which is pivoted on a lug 93' on the frame member 24, and means are provided for automatically reversing the position of said lever, to release one clutch and engage the other, after predetermined periods of operation, as follows: The shaft 42' is extended across the machine between the frame members 23 and 25, and the intermediate portion of said shaft is screw-threaded as indicated by dotted lines in Fig. 7. On said threaded portion of said shaft there is disposed an internally threaded sleeve 111 having a bar 113 rigidly secured thereto and extending to a guide-sleeve 112 which is mounted slidably on the rod 26. The guide-sleeve and bar, by preventing rotation of the threaded sleeve, cause the latter to be moved longitudinally of the shaft 42' in a direction corresponding to the direction of rotation of said shaft. For convenience of assembling, the sleeves 111 and 112, and bar 113 may be divided longitudinally and the two halves secured together by screws or like means. A clutch-shifting rod 114 is mounted slidably in bearings therefor in the frame members 23 and 25, said rod passing loosely through an opening in the intermediate portion of the bar 113. On opposite sides of said bar 113, coil springs 115 are disposed around the shifting-rod, and longitudinally adjustable collars 117 are provided on said rod to limit movement of said springs relatively thereto. Collars 118 are provided on the shifting-rod for limiting longitudinal movement thereof relative to the frame members 23 and 25. A portion of the shifting-rod extends through an opening in the clutch-lever 91', and at opposite sides of said lever cone-faced collars 122 are secured to the rod, so that by longitudinal movements of the same the clutch-lever may be actuated to engage and release the clutches 43' and 45'. In the portion of the shifting-rod which is movable within the bearing in the frame member 25, there are formed two annular grooves 121, and a ball 119 is disposed in an opening in the side of the bearing, as shown in Fig. 15, said ball being pressed yieldingly toward the rod by means of a spring 120 disposed in the opening behind the ball. The grooves 121 are so disposed that said ball enters one of the grooves at each limit of movement of the shifting-rod, forming a yieldable detent for preventing movement of the rod except upon the application of a predetermined force thereto. In the operation of the mechanism, after the threaded shaft 42' has rotated in one direction for a sufficient time, the longitudinal movement of the sleeve 111 causes the bar 113 to be pressed against one of the springs 115 and compresses said spring sufficiently to overcome the resistance of the yieldable detent formed by the ball and groove. As the ball is forced out of the groove, expansion of the spring 115 moves the shifting-rod suddenly to reverse the position of the clutch-lever 91' and thereby release the one and engage the other of the clutches 43' and 45'. Thereupon the direction of movement of the web-feeding mechanism is reversed, and the movement in the reverse direction is continued until the shift-controlling sleeve 111 has moved a sufficient distance along the shaft 42' to cause the bar 113 to compress the other spring 115 and overcome the resistance of the yieldable detent.

At positions intermediate the drive-rollers 61'—62' and the guide-rollers 63'—64', rods 127 and 128 extend parallel with said rollers between the frame members 23 and 25, said rods being fixedly connected with the frame and provided terminally with nuts 129. The rod 127 forms a fulcrum for the pivoted arms 65', and the movable advertising web passes beneath each of the rods, as shown in Fig. 5. Said rods 127 and 128 also serve to support the web-guiding devices shown in detail in Figs. 19 and 20. Said devices comprise pairs of plates 130, curved to conform to the drive-rollers 61'—62', and spaced to straddle the teeth 60' near the ends of said rollers adjoining the frame member 25. Said plates 130 are carried by collars 131 mounted pivotally on the rods 127—128, and are connected with said rods by springs 132 which tend to press the guide-plates toward the rollers. Bars 133 are connected with the guide-plates and extend laterally above the edge of the frame member 25, said bars carrying adjusting-screws 134 which bear upon said edge of the frame and limit movement of the guide-plates toward the rollers. Similar web-guiding devices are provided adjacent to the frame member 23, and are shown in detail in Figs. 21 and 22. In the latter devices the guide-plates 135 are carried by collars 136 mounted pivotally on pins 137 extending in from the side of the frame member 23. Springs 138 press the plates toward the drive-rollers, and said movement of the plates is limited by adjustment of the plates is limited by adjusting-screws 139 carried by laterally extending bars 140 and engaging the edge of the frame member 23, as shown.

In the use of the described operating mechanism the same is disposed in a vertical position, preferably at the end of the car or vehicle in which it is used, and is inclosed by a suitable casing 141, as shown in Figs. 1 and 2. Said inclosure or casing is provided with a sight-opening 142 adjacent to the portion of the station-indicating web which extends between the guide-rollers 63 and 64, and a similar, but larger, opening 143 adjacent to the portion of the advertising web between the guide-rollers 63' and 64', said openings 142 and 143 preferably being provided with transparent covers, as represented. In the operation of the mechanism the motor 31 is run continuously, so that the advertising display web is advanced intermittently at uniform intervals of time, determined by the proportions of the interrupted pinion 47' and gear 48', and the direction of movement is automatically reversed at intervals determined by the adjustment of the devices for actuating the clutch-shifting rod 114. Normally, said automatic shifting or reversing mechanism will be adjusted to change the direction of the feed when substantially all of the web has been unwound from one reel and wound onto the other. The station-indicating mechanism, being controlled manually, is operated and reversed at will, the control-cables 103 and 104 being extended to any convenient location, as to the station of the conductor of a street car or similar conveyance on which the mechanism is used.

Now, having described my invention, what I claim and desire to secure by Letters Patent is:

1. In a station indicator, web-driving rolls, a motor, clutch-controlled connecting means between said motor and said rolls for driving the latter, means for automatically throwing out said connecting means after a fixed period of operation thereof, and manually controlled means for throwing in said connecting means.

2. In a station indicator, an indicia-bearing member movable to positions for displaying different portions thereof, a motor, trains of driving mechanism between said motor and the indicia-bearing member for moving the latter in opposite directions, manually controlled means for selectively placing said driving trains into operative condition, and means for automatically throwing said driving trains out of operation after predetermined operative movements thereof.

3. In a changeable exhibitor, a flexible indicia-bearing web, reels to which the ends of the web are attached, a constantly moving driving member, selective driving means connecting said member and the reels and adapted to drive the latter in either direction, a manually actuated controlling device for placing said selective driving means in operation, and means for automatically throwing said driving means out of operation after predetermined movements thereof.

4. A station indicator comprising the combination with a driving motor, a flexible web bearing station indicia, reels to which the ends of the web are attached, drive-rollers engaging the web intermediate the reels, means connecting said drive-rollers and reels for actuating the latter to wind the web thereon, and reversible drive-gearing between the motor and drive-rollers, of clutches controlling said drive-gearing, clutch-controlling means, means biasing said clutch-controlling means to a neutral position, manually controlled means for actuating said clutch-controlling means to engage the clutches, means for retaining said controlling means in clutch-engaging position, and means actuated by the drive-gearing for releasing said retaining means.

5. In a machine of the class described, a flexible indicia-bearing web, a pair of guide-rollers over which the web is passed, a pair of reels to which the ends of the web are attached, a pair of drive-rollers having projections intermeshing with perforations of the web and engaging portions of the web intermediate the guide-rollers and the reels, web-tensioning means connected with one of the guide-rollers, reversible actuating means for the drive-rollers, means for retarding rotation of the reels, and driving connections between the drive-rollers and reels, said connections including frictionally driven members connected differentially with the reels and adapted to drive the same alternatively in conformity with movement of the drive-rollers.

JOHN A. GREER.